United States Patent Office 3,595,922
Patented July 27, 1971

3,595,922
BENZIL PREPARATION
Philip Manos, Wilmington, Del., assignor to E. I. du Pont de Nemours and Company, Wilmington, Del.
No Drawing. Continuation-in-part of application Ser. No. 551,872, May 23, 1966. This application Mar. 25, 1969, Ser. No. 810,376
Int. Cl. C07c 49/76
U.S. Cl. 260—590  3 Claims

ABSTRACT OF THE DISCLOSURE

Process for preparing benzils from benzoins by reaction with cupric carboxylate catalyst at 20–130° C. and oxygen.

CROSS-REFERENCE TO RELATED APPLICATIONS

This application is a continuation-in-part of application Ser. No. 551,872, filed May 23, 1966, now abandoned.

BACKGROUND OF THE INVENTION (1) Field of the invention

This invention relates to a novel catalytic method of oxidizing benzoins having the grouping —CHOHCO— to the corresponding benzils (1,2-dicarbonyl compounds).

(2) Description of the prior art

Benzil and substituted benzils, widely useful as photo-oxidants, and intermediates, are generally prepared from the corresponding benzoins. The disclosed oxidation methods however are not entirely suitable for commercial use. For example nitric acid [Adams and Marvel, Organic Synthesis I, 25 (1921)], the halogens [Corson and McAllister, J.A.C.S. 51 2822 (1929)], and catalytic copper oxide at high temperatures [Zelzche and Zala, Helv. Chim. Acta 9 288 (1926)] either do not give satisfactory yields or pure products, or cannot be applied broadly to various substituted benzoins. Cupric salt use in pyridine [Clarke and Dreger, Organic Syntheses Coll. Vol. I, 87 (1947)] has enjoyed wide utility, but requires stoichiometric copper quantities and expensive solvent that must be recovered and reprocessed. The Clarke et al. reference additionally discloses that spent $CuSo_4$/pyridine can be regenerated for reuse by passing air through it for 36 hours (15 hours not being long enough) and that air, in pyridine in the presence and absence of copper, is known to oxidize benzil to benzoic acid.

Weiss and Appel, J.A.C.S. 70 3666 (1948) have described a catalytic oxidation method involving $Cu^{II}$ in small proportion and excess ammonium nitrate to regenerate the $Cu^{II}$ oxidant. A serious drawback however is that ammonium nitrate is a hazardous explosive.

Bordner U.S. Pat. 2,377,749 describes the use of copper sulfate in the presence of pyridine. However, the reaction temperature is 85–100° C. and the reaction time is about two hours.

It is an object of this invention to provide an improved catalytic process for oxidizing benzoins to benzils which is applicable to a variety of substituted benzoins and obviates many of the disadvantages inherent in the prior methods.

SUMMARY OF THE INVENTION

The present invention is directed to a catalytic process for making benzils which comprises:

(I) Forming a reaction mixture consisting of—

(A) a benzoin having the structural formula

R'CHOHCOR wherein R and R' each represent phenyl, naphthyl, anthracenyl, phenanthryl, biphenylyl, terphenylyl, thiophenyl, furyl, pyridyl or quinolyl, or any of the foregoing groups substituted with halogen, hydroxyl, alkyl of 1–5 carbon atoms, phenyl, phenyl substituted $C_1$–$C_5$ alkyl, $C_1$–$C_5$ alkyl substituted phenyl, $C_1$–$C_5$ alkoxy, phenoxyl, phenyl substituted $C_1$–$C_5$ alkoxy, $C_1$–$C_5$ alkyl substituted phenoxyl, $C_1$–$C_5$ alkylthio, phenylthio, phenyl substituted $C_1$–$C_5$ alkylthio, $C_1$–$C_5$ alkyl substituted phenylthio or di($C_1$–$C_5$)alkylamino, (B) a cupric carboxylate in a small catalytic proportion based on said benzoin, which carboxylate is selected from acetate, benzoate, tallates or naphthenates, and (C) a solvent for said carboxylate and said benzoin which solvent is selected from the class consisting of acetic acid and water-miscible alcohols;

(II) Heating the resulting reaction mixture of (I) at 20° to 130° C. and (III) Passing a gas containing oxygen molecules into said reaction mixture until the benzoin content is substantially completely oxidized to the corresponding benzil.

A preferred embodiment is the heretofore described invention process wherein the oxygen-containing gas is passed into the reaction mixture until the $Cu^{II}$ characteristic color persists in the absence of added $O_2$ and the benzil is obtained substantially free of said benzoin.

This invention oxidation process is applicable to the preparation of a wide variety of benzils. The reactions are rapid and afford high quality products in good yields. This is surprising in view of the Clarke and Dreger Organic Syntheses, Coll. vol. I, 87 (1947) disclosure which suggests that not only is the $Cu^{II}$ regeneration step uneconomically slow but that attempts to effect it in the oxidation reaction mass itself are doomed to result in low benzil yields.

The catalytic copper/air combination offers substantial savings over the prior copper-based oxidation systems in that it (1) requires much smaller amounts of costly copper, (2) utilizes a $Cu^{II}$ regenerator ($O_2$) that is cheap and relatively innocuous compared to the expensive and hazardous $NH_4NO_3$, (3) functions in a wide variety of solvents (so that the process can be readily tailored to the properties of the particular α-hydroxy carbonyl and dicarbonyl compounds involved) and is not dependent on the use of expensive, hard-to-recover pyridine.

The benzoin, RCHOHCOR'

The term benzoin is used herein in the broad accepted sense to include R'CHOHCOR where R and R' stand not only for phenyl, but for higher carbocyclic aromatic radicals such as naphthyl, anthracenyl, phenanthryl, biphenyl, and terphenyl; also for heterocyclic aromatics such as thiophenyl, furyl, pyridyl, quinolyl and the like. These radicals may contain non-interfering substituents, that is substituents that do not prevent the benzoin from reducing cupric copper to a lower valent state, do not prevent $O_2$ from regenerating the $Cu^{II}$ catalyst, and preferably do not react with oxygen under process conditions. Representative substituents are: methyl, ethyl, t-butyl, phenyl, hydroxy, butoxy, phenoxy; dimethylamino, fluoro, chloro, bromo, iodo, methylthio. Thus, the substituents may broadly be halogen, hydroxyl, alkyl, aryl, aralkyl, alkaryl, alkoxyl, aroxyl, aralkoxyl, alkaroxyl, alkylthio, arylthio, aralkylthio, alkarylthio, and dialkylamino. Preferably alkyl and alk stand for the $C_1$–$C_5$ radicals, and aryl and ar stand for aromatic hydrocarbon radicals, e.g. phenyl. These substituent groups are compatible with the —CHOHCO— unit, that is, they do not interfere with the copper/oxygen oxidation system and are substantially inert to $O_2$ under process conditions.

Representative benzoins and their benzils include the following:

| R′CHOHCOR | R′COCOR |
|---|---|
| Benzoin | Benzil. |
| 2′-chlorobenzoin | 2-chlorobenzil. |
| 4-chlorobenzoin | 4-chlorobenzil. |
| 2,2′-dichlorobenzoin | 2,2′-dichlorobenzil. |
| 3,3′-dibromobenzoin | 3,3′-dibromobenzil. |
| 4,4′-diiodobenzoin | 4,4′-diiodobenzil. |
| 4-fluorobenzoin | 4-fluorobenzil. |
| 2′-methylbenzoin | 2-methylbenzil. |
| 3-ethylbenzoin | 3-ethylbenzil. |
| 4′-t-butylbenzoin | 4-t-butylbenzil. |
| 4-isopropylbenzoin | 4-isopropylbenzil. |
| 4,4′-diisopropylbenzoin | 4,4-diisopropylbenzil. |
| 2,2′-dimethylbenzoin | 2,2′-dimethylbenzil. |
| 2,4,6-trimethylbenzoin | 2,4,6-trimethylbenzil. |
| 2-methoxybenzoin | 2-methoxybenzil. |
| 4′-methoxybenzoin | 4-methoxybenzil. |
| 4-butoxybenzoin | 4-butoxybenzil. |
| 2,2′-dimethoxybenzoin | 2,2′-dimethoxybenzil. |
| 3,4-dimethoxybenzoin | 3,4-dimethoxybenzil. |
| 4,4′-dimethoxybenzoin | 4,4′-dimethoxybenzil. |
| 3′-chloro,4′-methoxybenzoin | 3-chloro,4′-methoxybenzil. |
| 4-benzylthiobenzoin | 4-benzylthiobenzil. |
| 4,4′-dibenzylthiobenzoin | 4,4′-dibenzylthiobenzil. |
| 4′-benzylthio-4′-methoxybenzoin | 4-benzylthio-4′-methoxybenzil. |
| 4′-dimethylaminobenzoin | 4′-dimethylaminobenzil. |
| 4-dimethylaminobenzoin | 4-dimethylaminobenzil. |
| Furoin | Furil. |
| Benzfuroin | Benzfuril. |
| 2-pyridoin | 2-pyridil. |
| 2-quinaldoin | 2-quinaldil. |
| Naphthabenzoin | Naphthabenzil. |
| α-Naphthoin | α-Naphthil. |
| β-Naphthoin | β-Naphthil. |
| 9,9′-phenanthroin | 9,9′-phenanthril. |
| 4′-dimethylaminobenzfuroin | 4′-dimethylaminobenzfuril. 346.2 |

The copper/oxygen catalyst system

The copper component may be any cupric carboxylate but normally will be a dissociable $Cu^{II}$ salt of an acid having a $pK_a$ in water of six or less. Representative examples are $Cu^{II}$ acetate and homologs (including mixed acids such as the tallates and naphthenates), benzoates, and homologs.

The copper compound may be added as such or as a complex with water, or alcohol, such as methanol or ethanol.

The $Cu^{II}$ compound is normally used in amounts ranging from .01 to .2 mole per mole —CHOHCO— compound, more usually .02 to .1 per mole. Lower proportions, though sometimes useful, do not always give the desired rapid reaction, while larger quantities, though operable, are normally not needed.

The oxygen component may be $O_2$ gas itself, or any $O_2$-containing gas wherein the carrier gas is substantially inert to the rest of the system, for example, air.

The role of copper:

(1a) $RCHOHCOR' + Cu^{+2} \rightarrow RCOCOR' + 2H^+ + Cu^0$ (1b) $RCHOHCOR' + 2Cu^{+2} \rightarrow RCOCOR + 2H^+ + 2Cu^+$ The role of oxygen:

(2a) 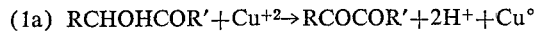

(2b) 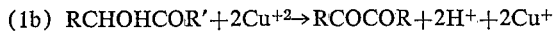

It will be noted that the lower valent copper may be cuprous or free copper. This depends on environmental factors such as the solvent and the particular —CHOHCO— compound employed. Oxygen serves simply to regenerate the $Cu^{II}$ oxidant.

Solvent

Suitable solvents include acetic acid and homologs or lower alcohols. The water miscible hydroxylic solvents particularly acetic acid and the alcohols are preferred as they facilitate product recovery.

The quantity of solvent is not cirtical, but usually amounts to from 1 to 30 parts per part by weight of the α-hydroxy carbonyl compound, usually from 5 to 15 parts per part.

Process conditions

The reactants may be combined in any order, but usually the $Cu^{II}$ compound and the benzoin are added to the solvent under agitation and with added heat as needed to solubilize at least part of these reactants. Molecular oxygen, as pure oxygen or more conveniently as air, is then passed into the system under conditions providing intimate contact between the gas and the liquid and/or solid phases. A variety of devices and techniques known to the art for effecting a gas-liquid contact may be used, including counter-current flow under continuous process conditions in columns and towers. It is sometimes desirable to flow the benzoin-containing reaction mixture down through a $Cu^{II}$ catalyst bed while passing the oxygen containing gas up through the bed.

The reaction temperature may vary widely depending on the reactants and the solvent system employed, but usually ranges from about room temperature to about 130° C., usually 50 to 110° C. The system pressure, while normally atmospheric, may also vary widely depending on the nature of the system.

Reaction time varies from a few minutes to an hour or so depending on the $Cu^{II}$ compound, the benzoin, the solvent, and the temperature. As stated above, an important feature of this invention is its built-in property of indicating the end of the reaction in the absence of added oxygen. As long as benzoin remains, no characteristic $Cu^{II}$ color will be observed. Persistence of the characteristic $Cu^{II}$ color signals the end point.

Another feature of this invention is that the starting benzoin can often be used in the form of the reaction mass resulting from its preparation, as described for example in chapter 5 of Organic Reactions, vol. IV, edited by Roger Adams, John Wiley and Sons, Incorporated, benzoins can be prepared by potassium cyanide catalyzed condensation of aromatic aldehyde in alcoholic media, also useful in the present process. Addition of cupric compound simultaneously (which has no deleterious effect on the present process) produces cupric cyanide. When subsequent treatment with oxygen is ineffective to convert such cuprous cyanide to cupric copper in a particular reaction mass, an additional catalytic quantity of $Cu^{II}$ compound may be added in accordance with this invention, and the oxidation to the benzil and regeneration of cupric copper by oxygen may then be effected in the usual manner.

The benzil can be recovered from the reaction mass and purified as desired according to known techniques, usually involving distillation, filtration or crystallization. Reaction masses utilizing the preferred water-miscible solvents and containing water-immiscible liquid or insoluble solid products are conveniently drowned in water to throw out the benzil, which is then separated from the residual solvent phase.

Representative examples further illustrating the invention follow.

EXAMPLE I

Cupric benzoate (.75 part by weight, .0025 mole) was added to benzoin (10.6 parts by weight, .05 mole) in methanol (100 parts by weight). Warming to 35–40° C. turned the mixture yellow, indicating complete Cu<sup>II</sup> reduction. Passing air through the mixture turned the solution green; when the air flow was stopped, the solution rapidly turned yellow again. Air was again blown through the mixture at a rate such that the solution maintained a greenish tint and the reaction mass temperature was 50–55° C. After one hour, the dark green solution was filtered and methanol was boiled off to condense the filtrate to about 60% of its original volume. A small volume of water was added till the solution just remained clody. The solution was cooled to 0–10° C. and filtered to obtain crystalline benzil, M.P. 94.5–95° C., in 98% yield.

EXAMPLE II

.5 molar benzoin in 100 parts by weight acetic acid solution containing .5 to one part by weight cupric acetate were sparged with excess air under conditions tabulated below. Reaction was considered complete ten minutes after the reaction mixture turned dark blue-green. Each mixture was filtered hot, cooled to 20–25° C. to crystallize the benzil, and filtered to recover the product.

TABLE I

[Oxygen-assisted Cu$^{II}$-catalyzed benzoin to benzil oxidation]

| R′CHOHCOR | Parts by weight | Molar Cu$^{II}$/ R′CHOHCOR | Reaction time, minutes at 100° C. | Benzil yield, percent |
| --- | --- | --- | --- | --- |
| Benzoin | 10.6 | .1 | 30 | 90 |
| 4,4′-dimethoxybenzoin (Anisoin) | 13.5 | .05 | 50 | 100 |
| 2′-methylbenzoin | 10.7 | .05 | 60 | 95 |
| 2-methoxybenzoin | 12.0 | .05 | 45 | 96 |
| 4-methoxybenzoin | 12.0 | .1 | 30 | 90 |
| 4,4′-dimethylbenzoin | 12.0 | .1 | 40 | 85 |
| 4-dimethylaminobenzoin | 12.5 | .1 | 35 | 80 |
| 2,5-dimethoxybenzoin | 13.5 | .1 | 45 | 80 |
| 2′-chlorobenzoin | 12.5 | .1 | 65 | 70 |
| 4-chlorobenzoin | 12.5 | .05 | 75 | 68 |
| α-Naphthabenzoin | 13.0 | .05 | 65 | 90 |
| 4,4′-dibenzylthiobenzoin | 22.5 | .05 | 55 | 95 |
| 4-benzylthiobenzoin | 17.0 | .05 | 50 | 90 |
| 4-benzylthio-4′-methoxybenzoin | 18.2 | .05 | 65 | 92 |

EXAMPLE III

Following the procedure of Examples I and II, air was sparged through .25 molar anisoin solutions, involving the solvents and Cu$^{II}$ oxidants (.1 mole/mole anisoin) shown in Table II, for one hour at 80–100° C.

The acetic acid system was worked up as in Example II. The other was diluted with an equal volume of water and filtered. The crude product was recrystallized from acetic acid to give anisil in the tabulated yields.

TABLE II

[O$_2$-assisted Cu$^{II}$-catalyzed anisoin to anisil oxidation]

| Cu$^{II}$ compound | Solvent | Anisil yield, percent |
| --- | --- | --- |
| Cu$^{II}$ benzoate | Acetic acid | 80 |
| Cu$^{II}$ acetate | Absolute ethanol | 95 |

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are as follows:

1. A catalytic process for making benzils which comprises:
   (I) forming a reaction mixture consisting essentially of
      (A) a benzoin having the structural formula

R′CHOHCOR wherein R and R′ each represent phenyl, naphthyl, anthracenyl, phenanthryl, biphenylyl, terphenylyl, thiophenyl, furyl, pyridyl or quinolyl, or any of the foregoing groups substituted with halogen, hydroxyl, alkyl of 1–5 carbon atoms, phenyl, phenyl substituted $C_1$–$C_5$ alkyl, $C_1$–$C_5$ alkyl substituted phenyl, $C_1$–$C_5$ alkoxy, phenoxyl, phenyl substituted $C_1$–$C_5$ alkoxyl, $C_1$–$C_5$ alkyl substituted phenoxyl, $C_1$–$C_5$ alkylthio, phenylthio, phenyl substituted $C_1$–$C_5$ alkylthio, $C_1$–$C_5$ alkyl substituted phenylthio or di($C_1$–$C_5$) alkylamino,
      (B) a cupric carboxylate in a small catalytic proportion based on said benzoin, which carboxylate is selected from acetate, benzoate, tallates or naphthenates, and
      (C) a solvent for said carboxylate and said benzoin which solvent is selected from the class consisting of acetic acid and water-miscible alcohols;
   (II) heating the resulting reaction mixture of (I) at 20° to 130° C. and then
   (III) passing a gas containing oxygen molecules into said reaction mixture until the benzoin content is substantially completely oxidized to the corresponding benzil.

2. A process according to claim 1 wherein the oxygen-containing gas is passed into the reaction mixture until the Cu$^{II}$ characteristic color persists in the absence of added O$_2$ and the benzil product is obtained substantially free of said benzoin.

3. A process according to claim 2 wherein (A) is benzoin, (B) is a Cu$^{II}$ acetate, and (C) is acetic acid.

References Cited

UNITED STATES PATENTS

| 2,377,749 | 6/1945 | Bordner | 260—590 |
| 2,658,920 | 11/1953 | Klein et al. | 260—590 |
| 2,883,426 | 4/1959 | Brackman | 260—596 |

DANIEL D. HORWITZ, Primary Examiner

U.S. Cl. X.R.

252—431; 260—289, 297, 332.3, 346.2, 347.8, 571, 576